March 26, 1929.   J. E. SCHRODER   1,707,178
MOLD INVERTING MECHANISM FOR GLASSWARE FORMING MACHINES
Filed March 24, 1928   2 Sheets-Sheet 1
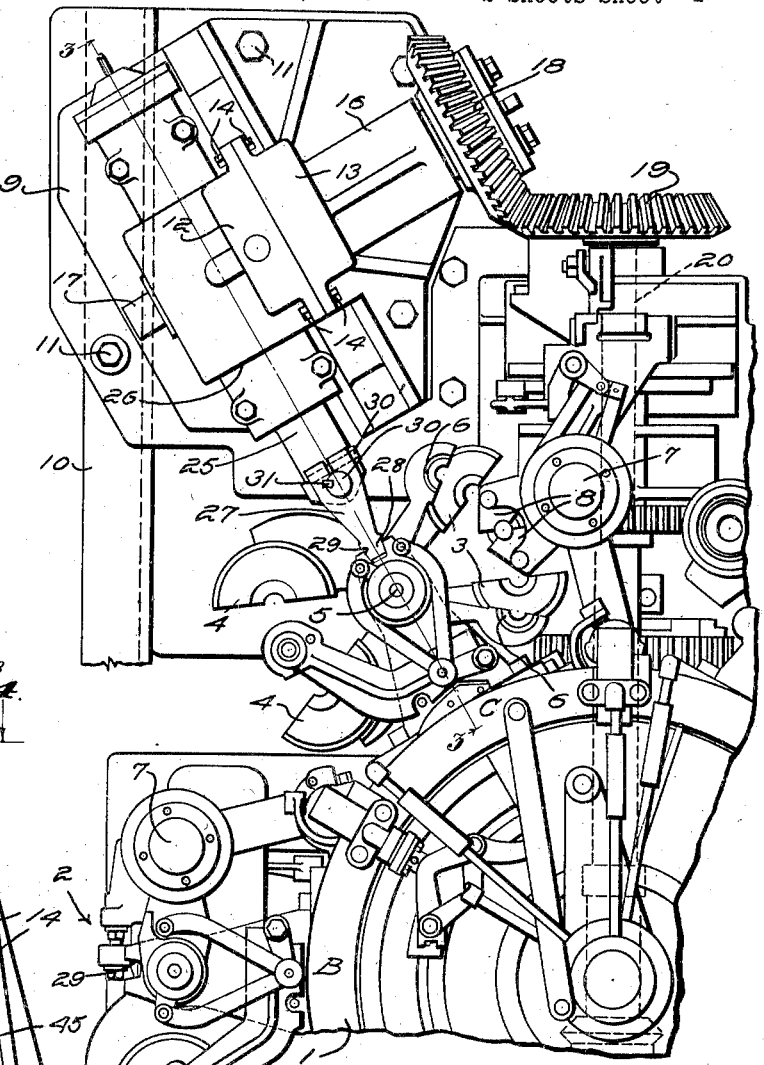
Inventor
John E. Schroder
by Robin D. Brown
Atty.
Witness
Winslow B. Thayer March 26, 1929. J. E. SCHRODER 1,707,178
MOLD INVERTING MECHANISM FOR GLASSWARE FORMING MACHINES
Filed March 24, 1928 2 Sheets-Sheet 2
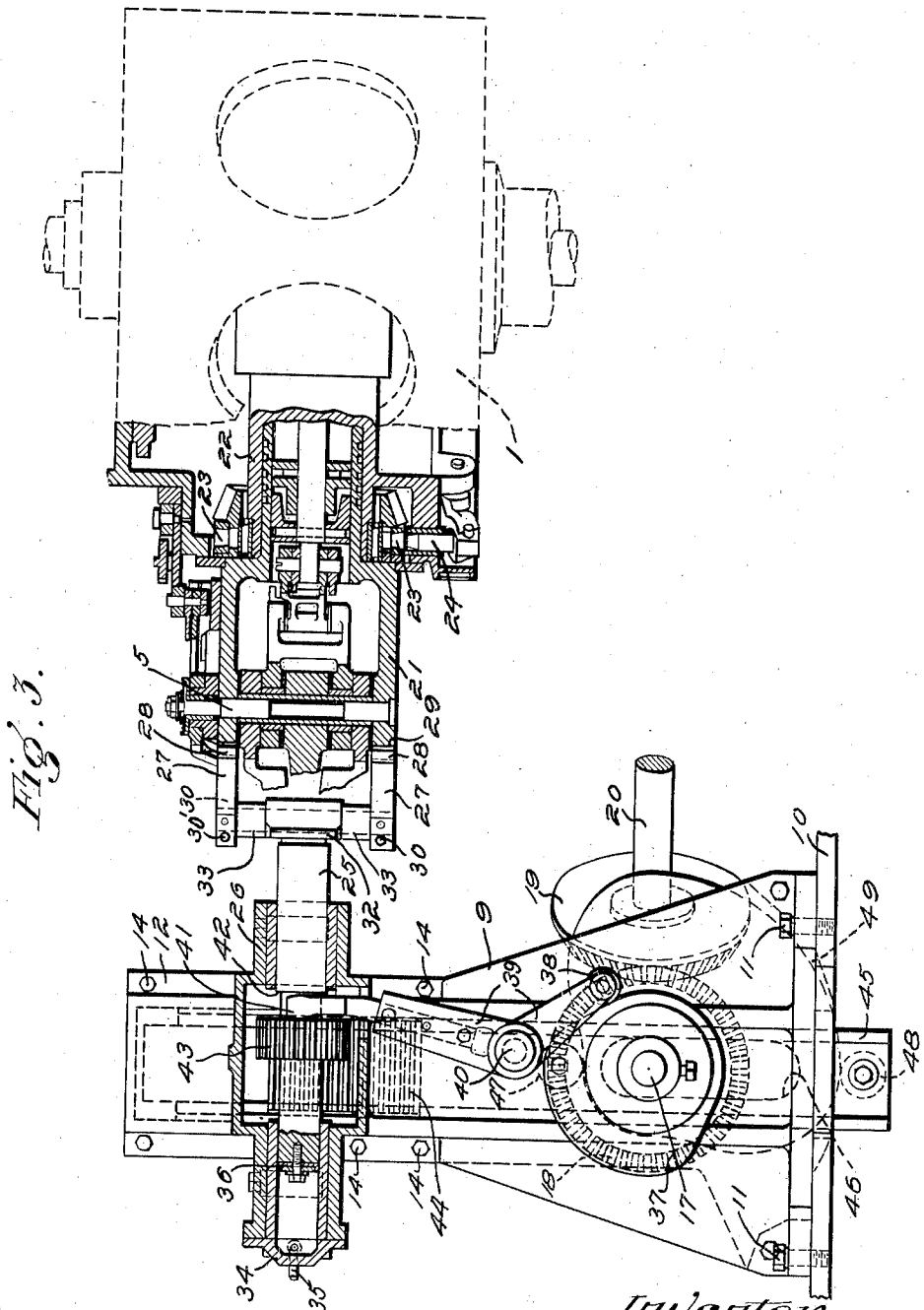
Witness
Winslow B. Thayer
Inventor
John E. Schroder
by Robson D Brown
Atty Patented Mar. 26, 1929.

1,707,178

UNITED STATES PATENT OFFICE.

JOHN E. SCHRODER, OF HARTFORD, CONNECTICUT, ASSIGNOR TO HARTFORD-EMPIRE COMPANY, OF HARTFORD, CONNECTICUT, A CORPORATION OF DELAWARE.

MOLD-INVERTING MECHANISM FOR GLASSWARE-FORMING MACHINES.

Application filed March 24, 1928. Serial No. 264,373.

This invention relates to glass blowing machines and more specifically to a device or mechanism for inverting a mold to be used in conjunction with a glass blowing machine of the turret type.

Turret type machines are quite common for making narrow neck ware and are usually provided with a plurality of molds disposed in circumferentially spaced relation about a turret which rotates about a vertical axis. In many cases these turrets are rotated intermittently an angular distance corresponding to the angular distance between adjacent molds, thus having the same number of dwell stations as there are molds disposed about the turret. It is usual to invert the parison mold as a part of the bottle making process, as the charge is dropped into the parison mold through the end opposite the neck forming end, and thereafter this mold with the parison is inverted before transfer to the blow mold. This requires the use of some mechanism effective to invert the molds either during or between the intermittent rotations of the turret. This mechanism has, in the past, been disposed within the confines of the turret or within the circumference of the mold path. When so located, it has been relatively difficult to get at to make any necessary adjustments such as might be required for various weights of molds, and also there has been necessary a relatively high multiplication of the movement imparted to the mechanisms used by the initial moving means, usually a cam, which tended to make the parts wear quite rapidly, and in some cases, to cause their breakage. Another difficulty incident to this type of inverting mechanism is the lost motion which accompanied the relatively high mechanical leverage and which, in some cases, resulted in the incomplete inversion or the over inversion of the molds dependent usually upon the weight of the molds and the position of their center of gravity with respect to the axis of rotation, which is usually radial of the turret, this difficulty becoming more pronounced after the parts are worn to some extent.

In general, the use of mechanism of the known type above described, has been somewhat unsatisfactory for various of these and other reasons, and among the objects of this invention are to provide a means for overcoming these various difficulties, preferably by locating the inverting mechanism wholly outside of the turret and the path of the molds mounted thereon and by using a smaller ratio of mechanical movements of the driving and driven parts.

A further object of the invention is to provide an inverting means which is timed with the movements of the various mold actuating mechanisms, so that the molds may be successively inverted preferably at a predetermined station and in timed relation with the various other movements which may take place at that and other stations.

For this purpose, I provide an arm which is mounted for longitudinal movement in alignment with the axis of inversion of the mold with which it is to cooperate, and means for moving this arm longitudinally into and out of engagement with the mold supporting parts and also for rotating this arm when so engaged to invert the mold, there being relatively small increase of movement due to the leverage, so as to minimize lost motion and insure the exact and proper inversion of the molds.

Further objects of the invention are to provide a resilient means for moving the arm into engagement with the mold and positive means for withdrawing it therefrom; and means for compensating for minor inaccuracies in the construction or positioning of the parts with which the arm is to engage, whereby my inverting device may cooperate with mold supporting parts of various types and whereby minor inaccuracies in the positioning of the supporting parts will not effect the proper operation of the machine.

A further object of the invention is to provide an inverting mechanism cooperating with a mold support on a turret type glass blowing machine so arranged and timed with respect to the operation of the machine that the mold supporting parts will be engaged by the inverting mechanism prior to the withdrawing of the locking means in the turret which normally lock the mold supporting mechanism against inversion; and also to so time these means that after the inversion, the locking means are again moved to operative position prior to the disengagement of the inverting mechanism with the mold support, whereby the mold is always held by either the locking means or the inverting mechanism.

Further objects and advantages of the present invention will be apparent from a reading of the following specification and subjoined claims when taken in connection with the accompanying drawings, in which:

Figure 1 is a fragmentary plan of a turret type glass blowing machine with my inverting mechanism shown in conjunction therewith;

Fig. 2 is an end elevation of the inverting mechanism looking in a direction substantially radial of and away from the turret;

Fig. 3 is an elevation of my inverting mechanism and one of the mold supporting members with parts in section on the line 3—3 in Fig. 1 and other parts omitted for purposes of clearness; and Fig. 4 is a section on the line 4—4 in Fig. 2.

I have chosen to illustrate my invention in combination with a glass blowing machine of the narrow neck type, such as is shown in the copending application of Edward H. Lorenz, Serial No. 490,567, filed August 8, 1921.

The blowing machine such as is illustrated in the accompanying drawings comprises a turret generally indicated at 1, which is provided with six pairs of molds 2, each pair consisting of a parison mold 3 and a finish blow mold 4, each of these molds being formed in two halves and supported on X-shaped supporting members pivoted about a normally vertical axis 5 which also serves as a support for the neck ring halves 6. The turret is intermittently rotated in a clockwise direction one-sixth of a revolution at each interval, this corresponding to the angle between each mold, and is driven by suitable mechanism (not shown). The mold charge is introduced into the bottom of the parison mold at a station below the one shown at the left in Fig. 1, at which station the settle blowing also occurs. The turret is then moved one-sixth of the revolution, bringing the parison mold 3 with the settled charge therein to station B (Fig. 1), during which passage the molds have been inverted by a suitable fixed rack, as shown and described in the application of Lorenz above referred to, thus bringing the parison mold into the position B indicated at the left in Fig. 1 in which position a blowhead 7 is swung into place to counterblow the parison. After this counterblowing operation is completed, the turret is moved again one-sixth of a revolution, bringing the molds to the transfer station C, during which time the neck ring 6 is opened, as shown in Fig. 1. After reaching station C, the neck gripping tongs 8 are closed about the neck of the parison, after which the parison mold 3 is opened. At the same time and by the same movement, the finish blow mold halves 4 are opened to permit the finished bottle formed in the previous cycle to be discharged. The next operation is the inversion of the duplex molds to bring the finish blow mold 4 about the parison, and it is to the mechanism for accomplishing this inversion or reversion to which this invention is specifically directed.

A suitable standard, generally indicated at 9, is secured to the base 10 of the machine, preferably by bolts 11, and may comprise two halves 12 and 13 secured together in any suitable manner, as by bolts 14. The members 12 and 13 are formed adjacent to their lower portions with bearings 15 and 16 in which is journaled a shaft 17 having a bevel gear 18 secured to one end which cooperates with a similar bevel gear 19 on one of the main drive shafts 20 of the blowing machine. Thus it will be seen that the inverting mechanism is driven in exact timed relationship with the blowing machine. The shaft 20 is designed to rotate constantly at the rate of six revolutions for each complete turret revolution or one revolution per cycle, and the gears 18 and 19 are of the same size, so that the shaft 17 also rotates at one revolution per cycle. Various of the movements for inverting the mold take place in response to rotation of the shaft 17.

The pivots 5 on which the mold supporting parts are journaled are mounted in forks 21 secured to or integral with drums 22, which are mounted for rotation about axes radial of the turret and sixty degrees apart. Means are provided for locking the forks 21 and the molds held thereby against inversion comprising a pair of tapered sockets 23 formed in parts fixed to each of the forks 21 and adapted to receive tapered locking bolts 24, of which there is one for each pair of molds and which are spring pressed into position in the manner described in the application of Lorenz referred to above, suitable cam means (not shown) being provided for withdrawing these bolts from their locking position to permit the inversion of the molds.

An arm 25 is mounted adjacent to the upper end of member 12 in suitable bearings in an extension 26 thereof and supports at its outer end (at the right, as seen in Figs. 1 and 3) a suitable means for engaging the fork 21 to invert the molds, this means comprising a pair of fingers 27 having their ends tapered, as shown at 28, to fit into suitable tapered recesses 29 in each arm of the forks 21. Fingers 27 are secured to a shaft 30, preferably by means of bolts 30′ adapted to squeeze together the split ends of the fingers about the shaft. The shaft 30 is provided with a spline or key 31 which is loosely received in a slot in the collar 32 fixed to the end of the arm 25, thus permitting the fingers 27 a slight lateral play with respect to the arm 25. Spacing collets 33 are provided properly to space the fingers 27 away from the collar 32. Thus it will be seen that on movement of the arm 25 to the right, as seen in Fig. 3, the tapered ends 28 of the fingers 27 will seat in the recesses 29 and a certain amount of lateral play will be provided, whereby this seating will be accomplished irrespective of slight irregularities in the positioning or construction of the various forks 21 in which the recesses 29 are formed. The arm 25 is mounted in longitudinally aligned position with the axis of the inversion of each pair of molds at the station C, so that upon its movement in a longitudinal direction into engagement with the molds, it will be perfectly aligned with them in either inverted position.

I provide means for moving the arm 25 longitudinally, preferably comprising a resilient means for moving this arm toward the mold, and a positive means for withdrawing it therefrom. The resilient movement toward the mold is accomplished by using the left hand end of the bearing of the rod 25 (Fig. 3) as a pneumatic pressure cylinder, that is, by closing the end of this bearing by a suitable cap 34 to which pneumatic pressure is at all times admitted through a pipe 35; and by providing the end of the arm 25 with suitable packing 36 to prevent the escape of pressure along the rod. As the pneumatic pressure is constantly admitted to this cylinder through the pipe 35, it will be seen that the arm 25 will be moved toward the molds whenever this action is permitted. The positive means for withdrawing the rod 25 from the mold, that is, moving it to the left as seen in Fig. 3, comprises a cam 37 on the shaft 17 cooperating with a cam roll 38 on one end of a bell-crank lever 39, pivoted at 40 to the member 12 and having its other end forked or bifurcated at 41 to engage in an annular groove 42 in the arm 25. Thus it will be seen that when the high part of the cam 37 is in engagement with the roll 38, the bell-crank lever 39 will be turned to its furthermost counter-clockwise position, and the arm 25 will be positively moved to the left. When, however, the low part of the cam 37 is opposite the roll 38, the arm 25 is released and the pneumatic pressure entering through the pipe 35 is permitted to move it to the right, so that the fingers 27 will engage in the recesses 29.

I provide means for rotating the arm 25 at the proper time comprising a pinion 43 fixed to the arm and adapted to cooperate with a relatively wide rack 44 which is integral with or secured to the upper end of a frame 45 having an enlarged cut out portion 46 through which the shaft 17 is adapted to pass. This frame is provided with upper and lower cam rollers 47 and 48 which together cooperate with a cam 49 to move the frame 45 and its rack 44 positively in a vertical direction.

The cams 37 and 49 are so designed and the inverting device is so timed with respect to the bottle forming machine that as the molds arrive at station C, the locking bolt 24 remains seated in its recess 23 until the rod 25 has been moved by pneumatic pressure to the right, so that the fingers 27 will engage in the recesses 29. Then the locking bolt 24 is withdrawn from the recess 23 and the continued rotation of the shaft 17 moves the rack 44 and frame 45 by the cam 49 so as to invert the mold, which inverted position is at the furthermost end of the vertical movement of the rack 45. The locking bolt 24 is then released by its positive withdrawing means and is spring pressed into engagement with the other of the recesses 23 to lock the molds in inverted position; and thereafter the fingers 27 and arm 25 are positively drawn to the left, as seen in Fig. 3, out of engagement with the mold support 21 and out of the path of movement of the molds at any time thereafter. Prior to the engagement of the fingers 27 with the next successive mold supporting member in the next cycle of the machine, the rack 44 is withdrawn to its initial position by the cam 49 in readiness for the next inverting movement.

While I have shown and described but one embodiment of my invention, it is obvious that many modifications might be made therein without departing from the spirit of the invention as set forth in the appended claims, which are to be construed as broadly as the state of the prior art permits.

I claim:

1. The combination with a bottle blowing machine having a turret and a mold support mounted for inversion about an axis extending outwardly from said turret, of an automatic means located wholly outside the confines of said turret and the path of said mold support for inverting said support.

2. The combination with a bottle blowing machine having a turret adapted to be rotated intermittently about a vertical axis and a plurality of mold supports disposed in circumferentially spaced relation about said turret, each mold support being mounted for inversion about an axis extending radially of said turret, of an automatic means located wholly outside the confines of said turret and the path of said mold supports for inverting them, said means operating in timed relation to the blowing machine to cooperate successively with each mold support to invert it during a dwell in the turret rotation.

3. The combination with a bottle blowing machine having a turret and a mold support mounted for inversion about an axis extending radially of said turret, of an automatic means for inverting said mold support comprising an arm mounted for longitudinal movement in alignment with said axis, means for moving said arm in a longitudinal direction, means on said arm to engage said mold support, and means for rotating said arm to invert said mold support when the parts are thus engaged.

4. The combination with a bottle blowing machine having a turret and a mold support mounted for inversion about an axis extending radially of said turret, of an automatic means for inverting said mold support comprising an arm mounted for longitudinal movement in alignment with said axis, resilient means for moving said arm longitudinally toward said mold support, positive means for moving said arm in the opposite direction, means on said arm to engage said mold, and means for rotating said arm to invert said mold support when the parts are thus engaged.

5. The combination with a bottle blowing machine having a turret adapted to be rotated intermittently about a vertical axis, and a plurality of mold supports disposed in circumferentially spaced relation about said turret, each mold support being mounted for inversion about an axis extending radially of said turret, of an automatic means for inverting said supports, said means comprising an arm mounted adjacent to one of said mold supports at a dwell position of said mold support and adapted to cooperate with each of said mold supports successively to invert them, said arm being mounted in alignment with the inversion axis of the mold support at said dwell position, resilient pneumatic means for moving said arm toward said mold support, means on said arm to engage said mold support, and means for rotating said arm to invert said mold support when the parts are thus engaged, said automatic means being operated in predetermined timed relation with said blowing machine.

6. The combination with a bottle blowing machine having a turret, a mold support mounted for inversion about an axis extending radially of said turret, and means for locking said mold support against inversion in both inverted positions, of an automatic means located wholly outside the confines of said turret and the path of said mold support and normally out of contact therewith for inverting it, said means being so timed with respect to said turret and said locking means that the inverting means is positively engaged with said mold support prior to the movement of said locking means to an inoperative position, and after inversion, said locking means are moved to locking position prior to the movement of said inverting means to its inoperative position.

7. The combination with a bottle blowing machine having a turret and a mold support mounted for inversion about an axis extending radially of said turret, of an automatic means for inverting said support comprising an arm mounted for longitudinal movement, means secured to said arm normally out of contact with said mold support but adapted to engage it at one end of the longitudinal movement of said arm, and means whereby the last named means may move laterally to compensate for minor inaccuracies in the construction or positioning of said mold support.

8. The combination with a bottle blowing machine having a turret adapted to be rotated intermittently about a vertical axis, and a plurality of mold supports disposed in circumferentially spaced relation about said turret, each mold support being mounted for inversion about an axis extending radially of said turret, of an automatic means for inverting them, a pneumatic cylinder associated with the outer end of said arm tending to move it longitudinally toward said mold support with a constant resilient pressure, means secured to the inner end of said arm adapted to engage said mold support, cam means for moving said arm positively away from said mold support against the action of said pneumatic cylinder, a pinion on said arm, a rack engaging said pinion by which said arm may be rotated, and cam means for moving said rack, both of said cam means being operated in timed relation with said blowing machine.

9. The combination with a bottle blowing machine having a turret adapted to be rotated intermittently about a vertical axis, and a plurality of mold supports disposed in circumferentially spaced relation about said turret, each mold support being mounted for inversion about an axis extending radially of said turret, of an automatic means for inverting said supports, a pneumatic cylinder associated with the outer end of said arm tending to move it longitudinally toward said mold support with a constant resilient pressure, means secured to the inner end of said arm adapted to engage said mold support, cam means for moving said arm positively away from said mold support against the action of said pneumatic cylinder, a pinion on said arm, a rack engaging said pinion by which said arm may be rotated, cam means for moving said rack, both of said cam means being operated in timed relation with said blowing machine, and locking means associated with each of said mold supports, said timed relation being such that the inverting means is positively engaged with said mold support prior to the movement of said locking means to an inoperative position, and after inversion, said locking means are moved to locking position prior to the movement of said inverting means to its inoperative position.

10. The combination with a bottle blowing machine having a turret adapted to be rotated intermittently about a vertical axis, and a plurality of mold supports disposed in circumferentially spaced relation about said turret, each mold support being mounted for inversion about an axis extending radially of said turret, of an automatic means for inverting said supports, said means comprising an arm mounted adjacent to one of said mold supports at a dwell position of said turret and adapted to cooperate with each of said mold supports successively to invert them, said arm being mounted in alignment with the inversion axis of the mold support at said dwell position, a pneumatic cylinder associated with the outer end of said arm tending to move it longitudinally toward said mold support with a constant resilient pressure, tapered fingers secured to the inner end of said arm adapted to enter corresponding tapered recesses in said mold support, the means securing said fingers to said arm permitting a limited amount of lateral play to compensate for inaccuracies in the construction or positioning of said mold supports, cam means for moving said arm positively away from said mold support against the action of said pneumatic cylinder, a pinion on said arm, a rack engaging said pinion by which said arm may be rotated, and cam means for moving said rack, both of said cam means being operated in timed relation with said blowing machine.

11. The combination with a bottle blowing machine having a turret adapted to be rotated intermittently about a vertical axis, and a plurality of mold supports disposed in circumferentially spaced relation about said turret, each mold support being mounted for inversion about an axis extending radially of said turret, of an automatic means for inverting said supports, said means comprising an arm mounted adjacent to one of said mold supports at a dwell position of said turret and adapted to cooperate with each of said mold supports successively to invert them, said arm being mounted in alignment with the inversion axis of the mold support at said dwell position, a pneumatic cylinder associated with the outer end of said arm tending to move it longitudinally toward said mold support with a constant resilient pressure, tapered fingers secured to the inner end of said arm adapted to enter corresponding tapered recesses in said mold support, the means securing said fingers to said arm permitting a limited amount of lateral play to compensate for inaccuracies in the construction or positioning of said mold supports, cam means for moving said arm positively away from said mold support against the action of said pneumatic cylinder, a pinion on said arm, a rack engaging said pinion by which said arm may be rotated, cam means for moving said rack, both of said cam means being operated in timed relation with said blowing machine, and locking means associated with each of said mold supports, said timed relation being such that the inverting means is positively engaged with said mold support prior to the movement of said locking means to an inoperative position, and after inversion, said locking means are moved to locking position prior to the movement of said inverting means to its inoperative position.

12. The combination with a glass blowing machine having an intermittently rotating turret, a plurality of pairs of molds mounted in supports arranged circumferentially about said turret and adapted to be inverted about axes disposed radially of said turret, each of said pairs comprising a parison mold and a finish blow mold, and means adjacent to one of the dwell positions of said turret for holding a parison formed in a parison mold while the pair including said parison mold is inverted to bring the blow mold of the pair around said parison, of an automatic mold-inverting means located wholly outside the confines of said turret and the path of said pairs of molds, said inverting means being timed with respect to said blowing machine to cooperate successively with each pair of molds while at the transfer station for inverting them.

13. The combination with a glassware forming apparatus having an invertible mold of an inverting mechanism for said mold comprising a mold engaging member, means to move said member to and from a position in opertive engagement with said mold, and means effective to invert said member and said mold when they are thus engaged.

14. The combination with a glassware forming apparatus having an invertible mold of an inverting mechanism for said mold comprising a mold engaging member, means to move said member in a substantially straight line toward and away from a position in operative engagement with said mold, and means operative to move said member to invert said mold when said member is operatively engaged therewith, all of said means being operated by and in timed relation with the forming apparatus.

15. The combination with a glassware forming apparatus having an invertible mold of an inverting mechanism for said mold comprising a mold engaging member mounted for horizontal axial movement and for rotary movement about its axis, means for moving said member axially to and from a position in operative engagement with said mold, and means for imparting to said member a half revolution when thus engaged to invert said mold.

16. Glassware forming apparatus, comprising an invertible mold and an inverting mechanism for said mold comprising a mold engaging member mounted for axial movement and for rotary movement about its axis, cam operated means for moving said member axially to and from a position in operative engagement with said mold, and cam operated means for imparting to said member a half revolution in one direction when thus engaged to invert said mold and for restoring said member to its initial position after said member has been moved axially away from its mold engaging position.

17. The combination in a glassware forming apparatus, of a plurality of invertible molds, means for advancing said molds successively to an inverting station, and means permanently located at said station and adapted to move into operative engagement with the mold at said station and thereafter to move to invert the mold.

Signed at Hartford, Conn., this 22nd day of March, 1928.

JOHN E. SCHRODER.